Figure 1:
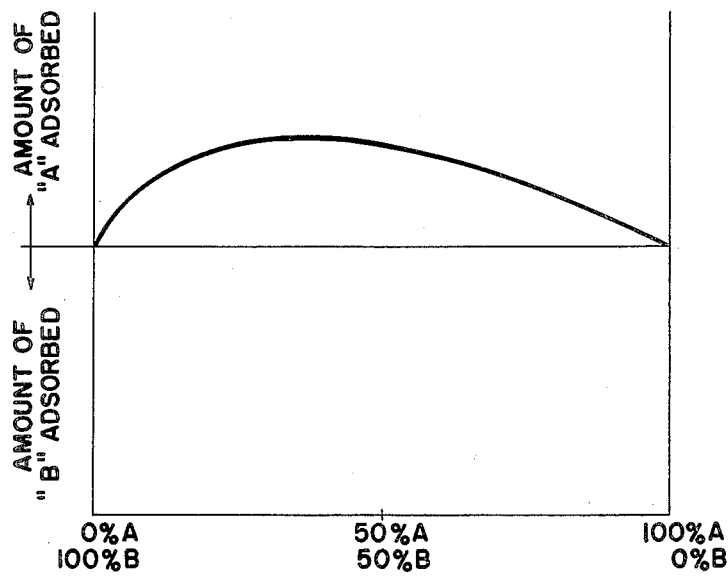

Feb. 27, 1951     A. E. HIRSCHLER     2,543,286

PROCESS FOR SEPARATING HYDROCARBONS

Filed Dec. 26, 1947

*INVENTOR.*
ALFRED E. HIRSCHLER
BY
*Busser and Harding*
ATTORNEYS

Patented Feb. 27, 1951

2,543,286

UNITED STATES PATENT OFFICE 2,543,286

PROCESS FOR SEPARATING HYDROCARBONS

Alfred E. Hirschler, Drexel Hill, Pa., assignor to Sun Oil Company, Philadelphia, Pa., a corporation of New Jersey Application December 26, 1947, Serial No. 794,033

6 Claims. (Cl. 260—666)

This invention relates to the separation of hydrocarbons by adsorption and particularly to the separation of hydrocarbons having the same degree of saturation. More specifically, the invention relates to a process for separating such hydrocarbons involving at least two adsorption steps conducted at different operating temperatures.

Methods are known for separating hydrocarbons by treating a mixture of the same with a granular adsorbent material such as silica gel or activated carbon to remove one or more of the hydrocarbons by selective adsorption. This procedure has been employed mainly for separating hydrocarbons according to chemical type where the different types of hydrocarbons concerned have greatly different adsorptive properties. Thus, adsorption methods have been utilized to remove unsaturated hydrocarbons such as olefins or aromatics from saturated hydrocarbons such as paraffins or naphthenes. As a general rule, the adsorptivity of hydrocarbons increases as the unsaturation or number of double bonds per molecule increases, so that an unsaturated hydrocarbon may readily be selectively adsorbed from a mixture containing the same together with a more saturated hydrocarbon.

It has generally been thought that hydrocarbons having the same degree of saturation would not exhibit any substantial difference in adsorbability, especially when the hydrocarbons are not greatly different in molecular weight. For example, it has been generally considered that two paraffin hydrocarbons, or two naphthenes, would have so nearly the same adsorbabilities as not to be separable by adsorption and especially so when the hydrocarbons are isomers or adjacent homologues. Likewise, the adsorption method has been presumed to be ineffective to separate two olefins having the same number of double bonds per molecule, or two aromatics having the same number of aromatic rings or double bonds per molecule.

More recently, however, I have found that hydrocarbons which have the same degree of saturation may be separated by selective adsorption, employing adsorbents such as silica gel or activated carbon. This is true even of hydrocarbons that are very closely related such as isomers or adjacent homologues, and a separation of such hydrocarbons generally may readily be accomplished in this manner. Methods of separating various types of hydrocarbons of the same degree of saturation are disclosed and claimed in my co-pending applications as follows: Serial Nos. 643,762, now abandoned, 643,763, now Patent No. 2,448,488, and 643,764, now Patent No. 2,464,931, filed January 26, 1946; Serial No. 660,076, now abandoned, filed April 6, 1946; Serial Nos. 672,683, now abandoned, 672,684, now abandoned, 672,685, now Patent No. 2,480,242 and 672,686, now Patent No. 2,532,668 filed May 10, 1947; and Serial No. 747,277, now Patent No. 2,518,236 filed May 10, 1947.

With a given adsorbent and at a given operating temperature, the adsorption behavior of hydrocarbon pairs in which the components have the same degree of saturation may be classified as of two general types. With some hydrocarbon pairs, one of the members will be selectively adsorbable at all concentrations. With other pairs of such hydrocarbons, one of the members will be selectively adsorbable within a certain concentration range while the other member will be the more adsorbable component at all other compositions of the mixture.

Figure 2:
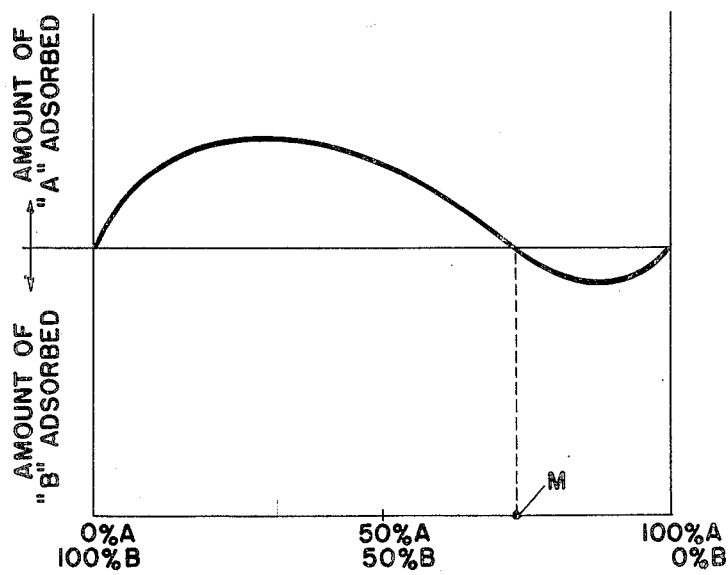

These types of behavior can best be illustrated by means of adsorption isotherms, such as are shown in Figures 1 and 2 of the accompanying drawings. As is well known, the adsorption isotherms show the relationship between composition of the mixture at equilibrium with a given amount of adsorbent and the amount of component adsorbed. (The latter value is the "apparent" amount as customarily calculated from the change in composition of the mixture before and after adsorption assuming no adsorption of the other component.)

Figure 1 represents the type of behavior where, at a given temperature, one of the hydrocarbons is preferentially adsorbed at all concentrations. From a mixture of the hydrocarbons, A and B, hydrocarbon A is selectively adsorbed regardless of its proportion in the mixture. The type of curve shown in Figure 1 is generally referred to as a U-type adsorption isotherm.

Figure 2 illustrates the other type of system in which, at a given temperature, one of the components is selectively removable within a certain concentration range whereas at all other concentrations the other hydrocarbon is the preferentially adsorbable component. At the point where the adsorption isotherm curve crosses the horizontal line (corresponding to the composition represented by point "M"), there is no difference in adsorbability and neither component is selectively removable. Thus, component A can be selectively adsorbed from any mixture of A and B which contains between 0%

A and the percentage corresponding to "M," while component B can be preferentially removed when the percentage of A is above that corresponding to "M." At composition "M," no separation can be obtained.

It is apparent that when the starting mixture of the type illustrated by Figure 2, the amount of separation obtainable at a given operating temperature will be limited. While it will be possible to obtain a fraction containing one of the components in relatively pure form, the maximum possible concentration for the other component will be that corresponding to point "M." When a charge material of this type is passed through a bed of adsorbent, the more strongly adsorbed component will be preferentially retained by the adsorbent and the other component can be obtained in relatively high concentration in the first portion of filtrate. However, upon displacing all of the charge hydrocarbons from the bed as by means of a suitable desorbing agent, the composition of the latter fractions may approach that corresponding to point "M" but cannot exceed the concentration of the more adsorbable component at "M." This applies regardless of whether the proportion of A to B in the starting mixture is such that A is selectively adsorbed or such that B is the more adsorbable component.

The present invention is concerned with a process for separating hydrocarbons which exhibit an S-type adsorption isotherm, as illustrated in Figure 2. I have discovered that with mixtures of this type the proportion of components at which the hydrocarbons have the same adsorbability varies with the operating temperature. In other words, the position of point "M" in Figure 2 changes as the temperature changes, so that a mixture which is not separable at one temperature can be separated by means of the same adsorbent at a substantially different temperature. Briefly, the process comprises treating a mixture of such hydrocarbons in liquid phase with a selective adsorbent in a first step and obtaining a fraction in which the hydrocarbons are present in a proportion approaching that at which their adsorbabilities are the same, in other words in a proportion approximating that, or not greatly different from that, at point "M." This fraction is then treated in a second step with adsorbent of the same type but at a substantially different temperature from that of the first treatment to effect further separation of the hydrocarbons.

The effect of temperature in changing the point where the components have identical adsorbabilities applies for any mixtures of hydrocarbons having the same degree of saturation which mixture exhibits an S-type adsorption isotherm. Such mixtures are included within each of the following types of hydrocarbon combinations: n-paraffin-n-paraffin; isoparaffin-isoparaffin; n-paraffin-isoparaffin; n-paraffin-naphthene; isoparaffin-naphthene; naphthene-naphthene; mono-olefin-mono-olefin; diolefin-diolefin; and aromatic-aromatic. The invention may be applied in the separation of any of such mixtures which have an S-type adsorption isotherm.

The preferred adsorbents for practicing the invention are silica gel and activated carbon. The invention is applicable, however, where other adsorbents are used provided the adsorbent chosen has a sufficiently high adsorptive capacity for the charge hydrocarbons and an S-type adsorption isotherm obtains at the operating temperature in the first step. Among the other adsorbents which may be useful, dependent upon what the particular hydrocarbons are in the charge, are activated aluminas such as bauxite, activated magnesia and various activated clays. As a general rule, however, silica gel or activated carbon will effect a much better separation than other commercially available adsorbents.

Any suitable operating temperatures may be employed in the two adsorption steps but the temperature in the second step should be sufficiently different from that in the first to cause a substantial shift in the composition at which there is no selective adsorption. As a general rule, the difference between the two temperatures should be at least 15° C. and preferably should be more than 30° C. The temperature in the second step may be either higher or lower than in the first step provided a sufficient temperature difference is maintained. It is generally desirable to avoid the use of high temperatures, since the adsorptive capacity of the adsorbent will decrease as the temperature increases. For this reason, it is advantageous to provide refrigerating means so that as low a temperature as is feasible may be employed in one of the two steps.

In practicing the process, each adsorption step is carried out preferably by filtering the charge through a bed of the adsorbent, as for example by percolating the charge through a column containing a relatively large amount of the adsorbent. The second step may be carried out in a different column from that used in the first step or in the same column after the adsorbent has been regenerated. In each step after all of the charge has passed into the adsorbent, it may be followed by a desorbing agent comprising a liquid more strongly adsorbable than the adsorbate to effect its displacement. Polar organic liquids, such as alcohol or acetone, are particularly suitable for desorbing silica gel. Aryl compounds, such as benzene, toluene, xylene, phenol or the like, may be used to desorb activated carbon. Aromatic hydrocarbons may also be used to desorb silica gel when the adsorbate comprises saturated hydrocarbons, olefins, or diolefins. The desorbing agent should be so selected with respect to boiling point that it will be readily separable from the desorbed hydrocarbons by distillation. In each treating step the efflux from the column may be collected in separate fractions as desired in order to segregate those portions having the desired purity. In case the desired purity of the less adsorbable component is not attained by one percolation in either the first or second step, the filtrate fractions may be retreated with fresh adsorbent at the same or a different temperature to effect further purification.

By way of example, the treatment of a mixture of 2,2,4-trimethylpentane and methylcyclohexane is illustrative. It was found that this pair of hydrocarbons with a silica gel adsorbent gave an S-shaped adsorption isotherm at 10° C., with the point of no selectivity occurring at 19% by volume of 2,2,4-trimethylpentane. At the same temperature but below this percentage the 2,2,4-compound is selectively adsorbed, while above this percentage the methylcyclohexane is selectively adsorbed. However, it was found that at a temperature of −60° C. the point of no selectivity occurred at 61% by volume of 2,2,4-trimethylpentane. Thus, if a starting mixture of these two compounds containing substantially less than 19% 2,2,4-trimethylpentane is percolated through a bed of silica gel at 10° C., the 2,2,4-trimethylpentane will be selectively adsorbed and the first fraction of filtrate will be enriched with respect to the methylcyclohexane. Upon displacing the adsorbate from the gel, one or more fractions may be obtained having a composition approaching that at which neither component is selectively adsorbable at 10° C. (i. e. approaching 19% 2,2,4-trimethylpentane). These fractions may then be treated by percolation through a bed of silica gel at —60° C. and further selective adsorption of the 2,2,4-trimethylpentane will be obtained. In this second treatment, one or more adsorbate fractions may be obtained in which the concentration of 2,2,4-trimethylpentane approaches 61%. The latter fractions may, if desired, then be treated with silica gel at 10° C. to effect further separation, in which case the methylcyclohexane will be selectively adsorbed and the first portions of filtrate will contain the 2,2,4-trimethylpentane in relatively pure form. Thus, either component of the starting mixture may be obtained in high purity.

On the other hand, if the starting mixture contains more than 19% 2,2,4-trimethylpentane and is treated with silica gel at 10° C., the methylcyclohexane will be the component that is selectively adsorbed and the 2,2,4-trimethylpentane will be obtained in enriched form as the first portions of filtrate. Treatment of the adsorbate fraction at —60° C. will then cause preferential adsorption of the 2,2,4-compound, permitting the methylcyclohexane to be obtained as filtrate of high purity.

Various specific examples of starting mixtures to which the invention is applicable with silica gel as the adsorbent are shown in the following table, which gives compositions corresponding to the points of zero selectivity at different temperatures.

*Adsorbent: silica gel*

| System | | Composition at Point of Zero Selectivity, Per Cent A | | |
|---|---|---|---|---|
| Component A | Component B | 10° C. | —50° C. | —60° C. |
|  |  | Per cent | Per cent | Per cent |
| 2,2,4-trimethylpentane | methylcyclohexane | 19 |  | 61 |
| Do | n-octane | 40 | 54 |  |
| n-heptane | methylcyclohexane | 50 |  | 69 |
| n-octane | ethylcyclohexane | 30 | 53 |  |
| 2,2,5-trimethylhexane | do | 14 |  | 30 |

In every case the change in temperature shown effected a substantial shift in the point at which the two components have the same degree of adsorbability. It is to be understood that the particular systems listed are merely illustrative, having been selected at random, and that there are a vast number of other systems to which the invention is applicable.

In some cases a change in the operating temperature may cause the adsorption isotherm to change from S-type (as in Figure 2) to U-type (as in Figure 1). This is illustrated by the system, 2,2,4-trimethylpentane and methylcyclohexane with activated carbon as the adsorbent. At —60° C., the point of zero selectivity occurs at a proportion of 35% by volume of 2,2,4-trimethylpentane, with this compound being selectively adsorbed at all proportions below this value while the methylcyclohexane is selectively adsorbed at all higher proportions. However, at 10° C., the 2,2,4-trimethylpentane is selectively adsorbed at all proportions. In starting with a mixture of these compounds containing (say) 70% 2,2,4-trimethylpentane, it would be possible theoretically to obtain each component in relatively pure form merely by treating with activated carbon at 10° C. However, in practice it has been found to be difficult to obtain the adsorbate fraction in high purity. It may well be advantageous, therefore, to treat the mixture in accordance with the present invention by contacting it with activated carbon in a first step conducted at about —60° C. to selectively adsorb the methylcyclohexane and yield the 2,2,4-compound in relatively high purity as filtrate. The adsorbate fraction subsequently may be treated with activated carbon in a second step at a temperature of about 10° C. to selectively adsorb the 2,2,4-trimethylpentane and yield methylcyclohexane of high purity as filtrate.

While the invention has been illustrated with reference to certain specific hydrocarbons, it is by no means limited thereto but may be applied to the separation of any pair of hydrocarbons having the same degree of saturation, or the same number of double bonds per molecule, and which have an S-type adsorption isotherm at the temperature employed in the first adsorption step.

Having described my invention, what I claim and desire to protect by Letters Patent is:

1. In a process of separating hydrocarbons of the same degree of saturation by selective adsorption wherein a liquid mixture of such hydrocarbons is treated with a granular adsorbent at a temperature at which the hydrocarbons exhibit an S-type adsorption isotherm and the mixture is thereby separated into a fraction containing one of the hydrocarbons in relatively purified form and another fraction containing the charge hydrocarbons in a proportion approaching that at which their adsorbabilities are the same, the improvement which comprises then treating the last-named fraction in liquid phase with adsorbent of the same type at a substantially different temperature from that of the first treatment, thereby effecting further separation of said hydrocarbons.

2. In a process of separating hydrocarbons of the same degree of saturation by selective adsorption wherein a liquid mixture of such hydrocarbons is treated with silica gel at a temperature at which the hydrocarbons exhibit an S-type adsorption isotherm and the mixture is thereby separated into a fraction containing one of the hydrocarbons in relatively purified form and another fraction containing the charge hydrocarbons in a proportion approaching that at which their adsorbabilities are the same, the improvement which comprises then treating the last-named fraction in liquid phase with silica gel at a substantially different temperature from that of the first treatment, thereby effecting further separation of said hydrocarbons.

3. In a process of separating hydrocarbons of the same degree of saturation by selective adsorption wherein a liquid mixture of such hydrocarbons is treated with activated carbon at a temperature at which the hydrocarbons exhibit an S-type adsorption isotherm and the mixture is thereby separated into a fraction containing one of the hydrocarbons in relatively purified form and another fraction containing the charge hydrocarbons in a proportion approaching that at which their adsorbabilities are the same, the improvement which comprises then treating the last-named fraction in liquid phase with activated carbon at a substantially different temperature from that of the first treatment, thereby effecting further separation of said hydrocarbons.

4. In a process of separating hydrocarbons of the same degree of saturation by selective adsorption wherein a liquid mixture of such hydrocarbons is passed through a bed of granular adsorbent at a temperature at which the hydrocarbons exhibit an S-type adsorption isotherm and the filtrate from the bed is collected in separate fractions including a fraction containing one of the hydrocarbons in relatively purified form and another fraction containing the charge hydrocarbons in a proportion approaching that at which their adsorbabilities are the same, the improvement which comprises then passing the last-named fraction in liquid phase through a bed of the same type of adsorbent at a substantially different temperature from that of the first treatment, thereby effecting further separation of said hydrocarbons.

5. In a process of separating hydrocarbons of the same degree of saturation by selective adsorption wherein a liquid mixture of such hydrocarbons is passed through a bed of silica gel at a temperature at which the hydrocarbons exhibit an S-type adsorption isotherm and the filtrate from the bed is collected in separate fractions including a fraction containing one of the hydrocarbons in relatively purified form and another fraction containing the charge hydrocarbons in a proportion approaching that at which their adsorbabilities are the same, the improvement which comprises then passing the last-named fraction in liquid phase through a bed of silica gel at a substantially different temperature from that of the first treatment, thereby effecting further separation of said hydrocarbons.

6. In a process of separating hydrocarbons of the same degree of saturation by selective adsorption wherein a liquid mixture of such hydrocarbons is passed through a bed of activated carbon at a temperature at which the hydrocarbons exhibit an S-type adsorption isotherm and the filtrate from the bed is collected in separate fractions including a fraction containing one of the hydrocarbons in relatively purified form and another fraction containing the charge hydrocarbons in a proportion approaching that at which their adsorbabilities are the same, the improvement which comprises then passing the last-named fraction in liquid phase through a bed of activated carbon at a substantially different temperature from that of the first treatment, thereby effecting further separation of said hydrocarbons.

ALFRED E. HIRSCHLER.

REFERENCES CITED

The following references are of record in the file of this patent:

Hirschler et al., Ind. Eng. Chem., vol. 39, 1587 (1947).

Mair et al., Ind. Eng. Chem., vol. 39, 1072–81 (1947).